United States Patent
Heo et al.

(10) Patent No.: US 12,257,715 B2
(45) Date of Patent: Mar. 25, 2025

(54) ROBOT AND CONTROLLING METHOD THEREOF

(71) Applicant: Samsung Electronics Co., Ltd., Suwon-si (KR)

(72) Inventors: Kyuho Heo, Suwon-si (KR); Muwoong Lee, Suwon-si (KR); Jongmyeong Ko, Suwon-si (KR); Sangkyung Lee, Suwon-si (KR); Jiho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 17/974,941

(22) Filed: Oct. 27, 2022

(65) Prior Publication Data

US 2023/0066945 A1 Mar. 2, 2023

Related U.S. Application Data

(63) Continuation of application No. PCT/KR2022/008739, filed on Jun. 21, 2022.

(30) Foreign Application Priority Data

Aug. 26, 2021 (KR) ........................ 10-2021-0113506

(51) Int. Cl.
 B25J 9/16 (2006.01)
(52) U.S. Cl.
 CPC .................................. B25J 9/1661 (2013.01)
(58) Field of Classification Search
 CPC ....... G06Q 50/12; B25J 9/1661; B25J 11/008; B25J 9/00; B25J 13/00; G05D 1/0293
 See application file for complete search history.

(56) References Cited

U.S. PATENT DOCUMENTS 9,026,248 B1 5/2015 Hickman et al.
9,606,543 B2 3/2017 Jeon et al.
(Continued)

FOREIGN PATENT DOCUMENTS

CN 112621738 A 4/2021
JP 4713846 B2 6/2011
(Continued)

OTHER PUBLICATIONS

International Search Report with Written Opinion and English translation dated Oct. 7, 2022; International Appln. No. PCT/KR2022/008739.

*Primary Examiner* — Jaime Figueroa
*Assistant Examiner* — Zachary Joseph Wallace
(74) *Attorney, Agent, or Firm* — Jefferson IP Law, LLP

(57) ABSTRACT

A robot is provided. The robot includes a sensor, a driver, a communication interface, and a processor configured to acquire first context data through the sensor, receive second context data acquired by at least one other robot through the communication interface, identify at least one context data of the first context data and the second context data based on a collaboration scenario of the robot and the other robot, input the identified at least one context data to a predetermined task allocation algorithm related to the collaboration scenario to acquire task information corresponding to the robot, and control the driver based on the acquired task information.

18 Claims, 13 Drawing Sheets

(56) References Cited

U.S. PATENT DOCUMENTS

| | | |
|---|---|---|
| 10,750,920 B2 | 8/2020 | Park et al. |
| 2011/0135189 A1 | 6/2011 | Lee |
| 2016/0354923 A1 | 12/2016 | Kuffner, Jr. et al. |
| 2018/0073266 A1* | 3/2018 | Goldenberg ......... G05D 1/0295 |
| 2019/0212752 A1 | 7/2019 | Fong et al. |
| 2020/0039070 A1* | 2/2020 | Zavesky ................ B25J 9/1653 |
| 2020/0198122 A1* | 6/2020 | Newman ................ B25J 13/006 |

FOREIGN PATENT DOCUMENTS

| | | |
|---|---|---|
| KR | 10-1015313 B1 | 2/2011 |
| KR | 10-1091723 B1 | 12/2011 |
| KR | 10-1277452 B1 | 7/2013 |
| KR | 10-2015-0061398 A | 6/2015 |
| KR | 10-1668078 B1 | 10/2016 |
| KR | 10-2038052 B1 | 10/2019 |
| KR | 10-2020-0054351 A | 5/2020 |
| KR | 10-2137033 B1 | 7/2020 |
| KR | 10-2141714 B1 | 8/2020 |

* cited by examiner

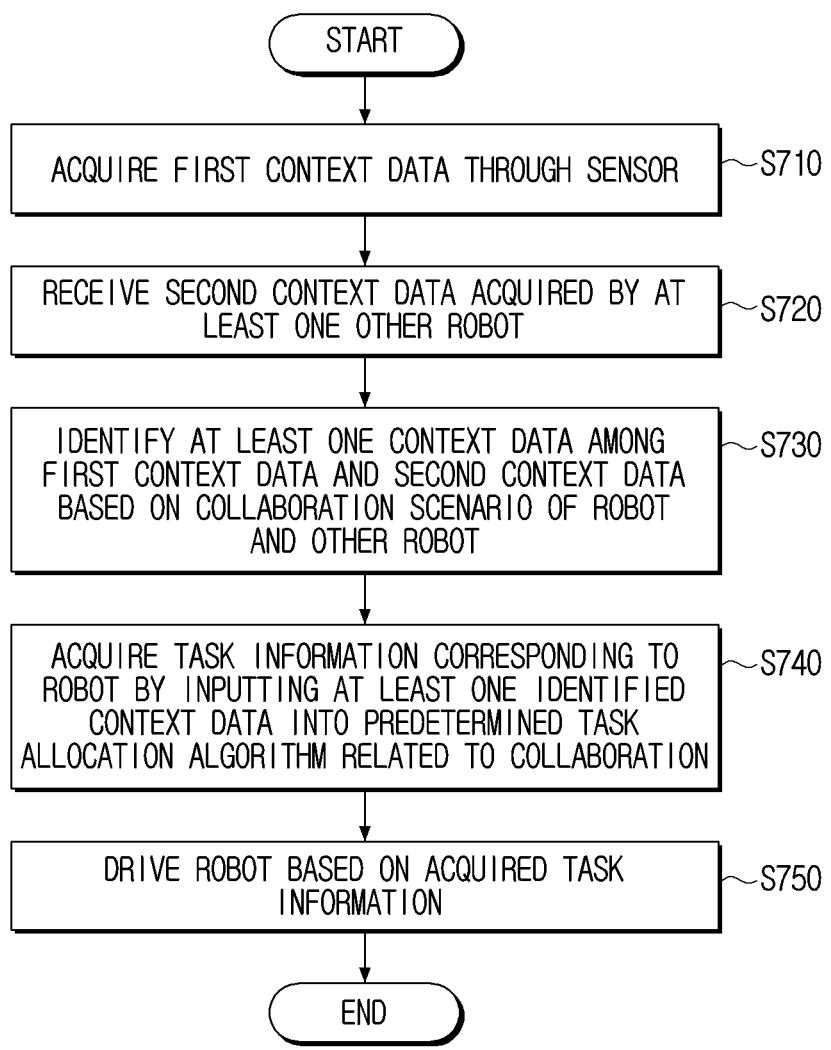

ROBOT AND CONTROLLING METHOD THEREOF

CROSS-REFERENCE TO RELATED APPLICATION(S)

This application is a continuation application, claiming priority under § 365(c), of an International application No. PCT/KR2022/008739, filed on Jun. 21, 2022, which is based on and claims the benefit of a Korean patent application number 10-2021-0113506, filed on Aug. 26, 2021, in the Korean Intellectual Property Office, the disclosure of which is incorporated by reference herein in its entirety.

TECHNICAL FIELD

The disclosure relates to a robot providing a service to a user and a method for controlling thereof.

BACKGROUND ART

Recently, technology for robots that are disposed in indoor spaces and provide services to users has been actively developed. When a plurality of robots are disposed in an indoor space to provide a service, the plurality of robots may be assigned a unique task under a control of a management server and provide a service corresponding to the assigned task.

However, the existing robot has a problem in that it is not possible to provide a seamless service since a task for the service is not assigned when a problem occurs in the management server. Accordingly, there has been a demand for a technique for cooperation among the plurality of robots to provide services to users without the management server.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide a robot configuring to provide a service corresponding to task information acquired based on context data acquired by the robot and context data received from the other robot, and a method for controlling thereof.

Additional aspects will be set forth in part in the description which follows and, in part, will be apparent from the description, or may be learned by practice of the presented embodiments.

Technical Solution

In accordance with an aspect of the disclosure, a robot is provided. The robot includes a sensor, a driver, a communication interface, and a processor configured to acquire first context data through the sensor, receive second context data acquired by at least one other robot through the communication interface, identify at least one context data of the first context data and the second context data based on a collaboration scenario of the robot and the at least one other robot, input the identified at least one context data to a predetermined task allocation algorithm related to the collaboration scenario to acquire task information corresponding to the robot, and control the driver based on the acquired task information.

The processor may, based on the identified at least one context data and constant data of the robot, acquire the task information corresponding to the robot, and wherein the constant data includes at least one of identification information of the robot, specification information of the robot, function information of the robot, map information corresponding to a space where the robot is located, priority information for each task.

The processor may, based on types of a plurality of elements related to the collaboration scenario of the robot and the at least one other robot, identify the at least one context data corresponding to each of the plurality of elements among the first context data and the second context data, and input the at least one context data corresponding to each of the plurality of elements into the predetermined task allocation algorithm to acquire the task information corresponding to the robot.

The processor may identify the at least one context data corresponding to each type of the plurality of elements based on at least one of an acquisition time point of each of the first context data and the second context data, whether there is a similarity, or whether emergency situation information is included.

The plurality of elements include at least one of type information of the external object, location information of the external object, location information of the robot or emergency situation information.

The predetermined task allocation algorithm may include at least one of a current task identification of the robot and the at least one other robot, a situation identification of an external object, or a cost identification for each task of the robot and the at least one other robot.

The processor may control the communication interface to transmit the first context data to the at least one other robot, and based on the at least one context data being identified, control the communication interface to transmit the identified at least one context data to the at least one other robot.

The processor may, based on other context data identified based on the collaboration scenario being received from the at least one other robot, input context data having a higher priority among the received other context data and the identified at least one context data into the predetermined task allocation algorithm to acquire the task information corresponding to the robot.

The processor may control the communication interface to transmit the first context data to the at least one other robot, based on other context data identified based on the collaboration scenario being received from the at least one other robot, identify whether the first context data is reflected in the received other context data, and based on the first context data identified as not being reflected in the received other context data, control the communication interface to retransmit the first context data to the at least one other robot.

The processor may, based on a signal indicating an occurrence of an error being received from a management server, perform a task allocation function based on the collaboration scenario.

In accordance with another aspect of the disclosure, a method performed by a robot is provided. The method includes acquiring first context data through a sensor of the robot, receiving second context data acquired by at least one other robot, identifying at least one context data of the first context data and the second context data based on a collaboration scenario of the robot and the at least one other robot, inputting the identified at least one context data to a predetermined task allocation algorithm related to the collaboration scenario to acquire task information corresponding to the robot, and driving the robot based on the acquired task information.

The acquiring of the task information may include, based on identified the at least one context data and constant data of the robot, acquiring the task information corresponding to the robot, and wherein the constant data includes at least one of identification information of the robot, specification information of the robot, function information of the robot, map information corresponding to a space where the robot is located, or priority information for each task.

The identifying of the context data may include, based on types of a plurality of elements related to the collaboration scenario of the robot and the at least one other robot, identifying the at least one context data corresponding to each of the plurality of elements among the first context data and the second context data, and wherein the acquiring of the task information includes inputting at least one context data corresponding to each of the plurality of elements into the predetermined task allocation algorithm to acquire the task information corresponding to the robot.

The identifying of the context data may include identifying the at least one context data corresponding to each type of the plurality of elements based on at least one of an acquisition time point of each of the first context data and the second context data, whether there is a similarity, or whether emergency situation information is included.

The plurality of elements may include at least one of type information of the external object, location information of the external object, location information of the robot or emergency situation information.

Effect of the Invention

According to various embodiments of the disclosure, since a plurality of robots may provide a service by being assigned a task required for collaboration of a plurality of robots without intervention of a management server, thereby improving user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 is a flowchart illustrating a controlling method according to an embodiment of the disclosure.

Throughout the drawings, it should be noted that like reference numbers are used to depict the same or similar elements, features, and structures.

BEST MODE FOR IMPLEMENTING THE DISCLOSURE

Figure 1:
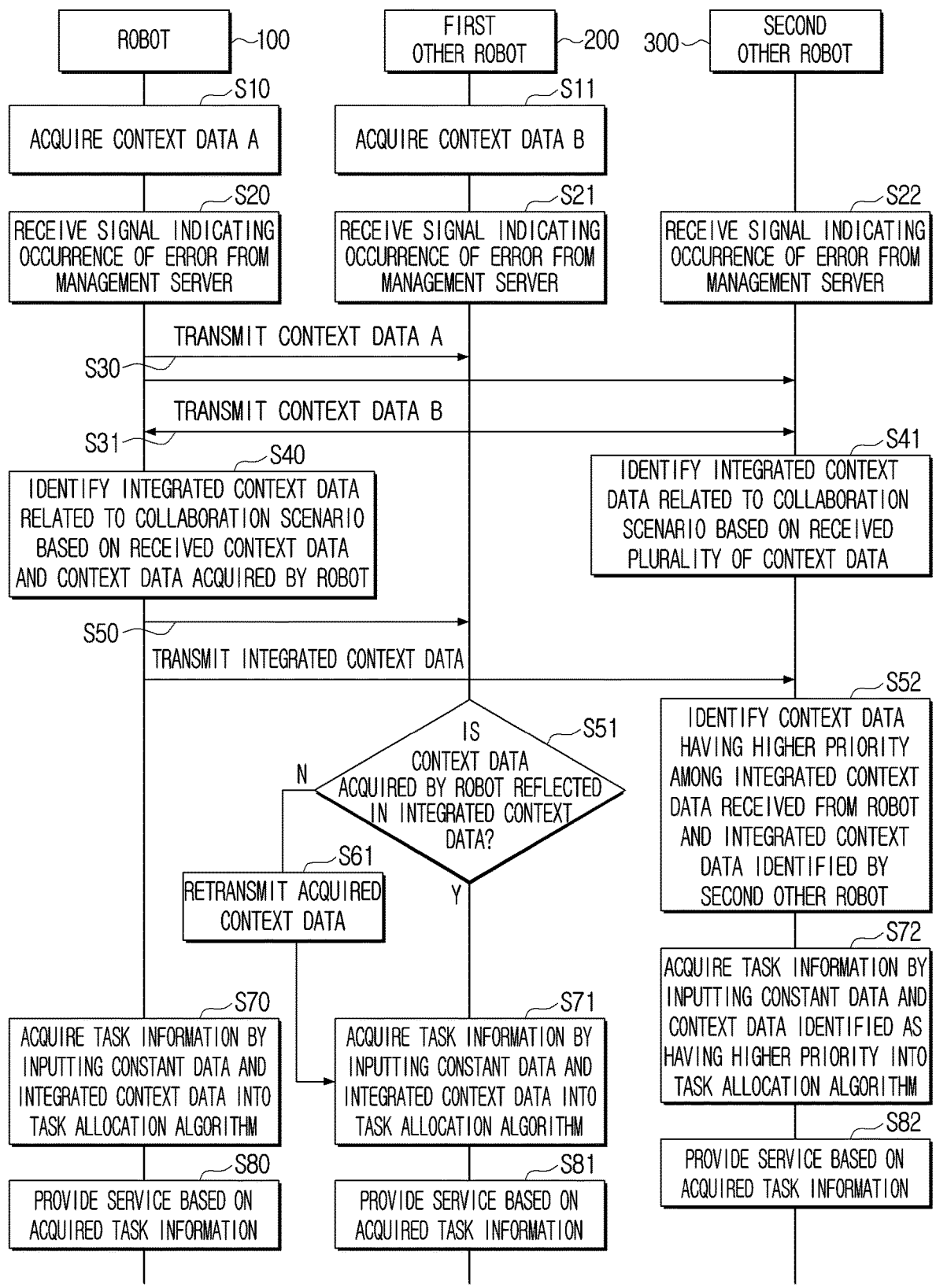
FIG. 1 is a view illustrating a service providing process of a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the application, the terms "include" and "comprise" designate the presence of features, numbers, operations, components, elements, or a combination thereof that are written in the specification, but do not exclude the presence or possibility of addition of one or more other features, numbers, operations, components, elements, or a combination thereof.

The expression at least one of A and/or B represents any one of either "A" or "B" or "A and B".

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

In the application, the terms "include" and "comprise" designate the presence of features, numbers, operations, components, elements, or a combination thereof that are written in the specification, but do not exclude the presence or possibility of addition of one or more other features, numbers, operations, components, elements, or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

In the disclosure, the "user" may refer to a person who receives a service from a robot, but is not limited thereto.

FIG. 1 is a view illustrating a service providing process of a robot according to an embodiment of the disclosure.

A robot 100 according to an embodiment of the disclosure may be disposed at a specific space, and provide a variety of services to users who have visited the space. Specifically, the robot 100 may provide a service corresponding to at least one of route guidance, serving, and cleaning to the user, but is not limited thereto.

In addition, at least one other robot 200 or 300 including the robot 100 may be disposed in a specific space, and the robot 100 and at least one other robot 200 or 300 may provide a service to the user through mutual collaboration. Here, a service provision through collaboration may refer to an operation in which the robot 100 and at least one other robot 200 or 300 provide services corresponding to different task information to the user.

At least one other robot 200 or 300 may be a robot having the same specification as the robot 100, or may be a robot that has a different specification from the robot 100. The at least one other robot 200 or 300 may be a robot that provides the user with a service corresponding to task information different from the task information acquired by the robot 100.

Referring to FIG. 1, at least one other robot 200 or 300 is illustrated as a first other robot 200 and a second other robot 300, respectively. As shown in FIG. 1, a total of three robots 100, 200, and 300 may be disposed in a specific space, but the disclosure is not limited thereto, and a larger number of robots may collaborate to provide a service to the user.

According to an embodiment, the plurality of robots 100, 200, 300 may be controlled by a management server. Specifically, the management server may receive data acquired by the plurality of robots 100, 200 and 300, and task information corresponding to the plurality of robots 100, 200 and 300 based on the received data. In addition, the management server may control service provision of the robots 100, 200, 300 by transmitting the acquired task information to the plurality of robots 100, 200 and 300.

However, when an error occurs in the server managing the plurality of robots 100, 200 and 300, the plurality of robots 100, 200 and 300 may acquire task information corresponding to each robot based on data collected by each robot without intervention of the server, and provide a service based on the acquired task information.

Figure 2:
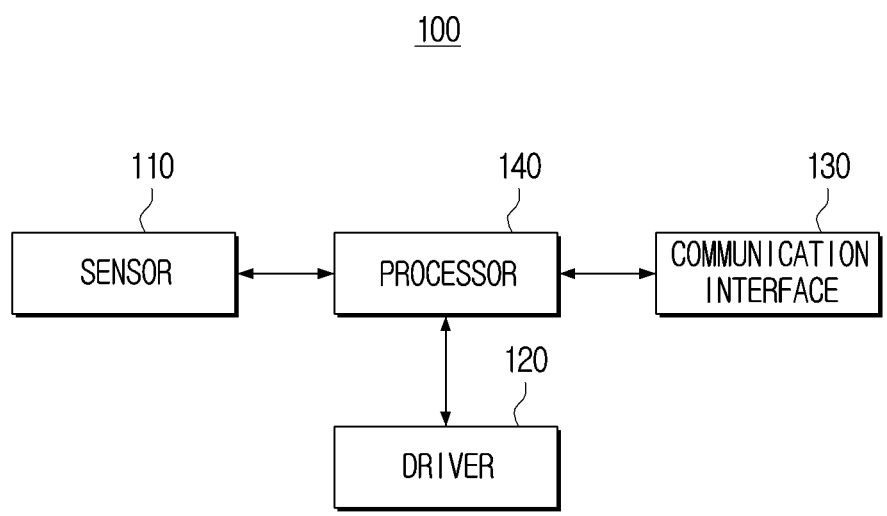
FIG. 2 is a view illustrating a configuration of a robot according to an embodiment of the disclosure.

FIG. 2 is a view illustrating a configuration of a robot according to an embodiment of the disclosure.

Referring to FIG. 2, the robot 100 may include a sensor 110, a driver 120, a communication interface 130, and a processor 140.

The sensor 110 may, for example, measure a physical quantity or detect an operational state of the robot 100, and convert the measured or detected information into an electrical signal. The sensor 110 may include a camera, the camera may include a lens that focuses visible light and other optical signals reflected and received by an object to an image sensor, and an image sensor capable of detecting the visible light and other optical signals. Here, the image sensor may include a two-dimensional (2D) pixel array divided into a plurality of pixels.

Also, the sensor 110 may include a microphone. The microphone is a component for collecting input sound by receiving the user's voice and ambient noise signals. Specifically, the microphone is a component that collectively refers to a device that receives sound waves and generates a current of the same waveform. The processor 140 may convert a sound signal included in the input sound into a digital signal based on the current of the waveform generated by the microphone.

The processor 140 may acquire context data including image data or sound data through the sensor 110 including a camera or a microphone.

In addition, the sensor 110 may include at least one of a distance sensor, a gesture sensor, a gyro sensor, a pressure sensor, a magnetic sensor, an acceleration sensor, a grip sensor, a proximity sensor, a color sensor (e.g., red, green, blue (RGB) sensor), a biological sensor, a temperature/humidity sensor, a brightness sensor, or an ultra violet (UV) sensor, and the sensor 110 according to an embodiment may be implemented in the form of a sensor module including at least one or more sensors.

The driver 120 is a device capable of driving the robot 100. The driver 120 may control a driving direction and a driving speed under a control of the processor 140, and the driver according to an embodiment may include a power generating device for generating power for the robot 100 to drive (e.g., a gasoline engine, a diesel engine, a liquefied petroleum gas (LPG) engine, an electric motor, etc. according to a fuel used (or energy source)), a steering device for controlling a driving direction (e.g., mechanical steering, hydraulic steering, electronic control power steering (EPS), etc.), a driving device for driving the robot 100 according to power (e.g., wheels, propellers, etc.), or the like. Here, the driver 120 may be modified according to the embodiment a traveling type (e.g., wheel type, walking type, flight types, etc.) of the robot 100.

The communication interface 130 may input and output various types of data. For example, the communication interface 130 may transmit and receive external devices (e.g., source devices), external storage media (e.g., universal serial bus (USB) memory), external servers (e.g., web hard drives) and various types of data through communication methods such as access point (AP)-based Wi-Fi (Wi-Fi, wireless local area network (LAN)), Bluetooth, ZigBee, wired/wireless local area network (LAN), wide area network (WAN), Ethernet, IEEE 1394, high-definition multimedia interface (HDMI), universal serial bus (USB), mobile high-definition link (MHL), audio engineering society/European broadcasting union (AES/EBU), Optical, Coaxial, or the like.

The processor 140 may perform communication with an external server or the other robot by using the communication interface 130. Particularly, the processor 140 may transmit context data to or receive context data from another robot through the communication interface 130.

The processor 140 may generally control the overall operation of the robot 100. Specifically, the processor 140 may be connected to each component of the robot 100 to control the overall operation of the robot 100. For example, the processor 140 may be connected to the sensor 110, the driver 120, and the communication interface 130 to control the operation of the robot 100.

According to an embodiment, the processor 140 may be named various names such as a digital signal processor (DSP), a microprocessor, a central processing unit (CPU), a micro controller unit (MCU), a micro processing unit (MPU), a neural processing unit (NPU), a controller, an application processor (AP), but it is described as the processor 140 in the disclosure.

The processor 140 may be implemented in a form of a system on chip (SoC), large scale integration (LSI), or a field programmable gate array (FPGA). In addition, the processor 140 may include volatile memory such as static random access memory (SRAM), or the like.

The processor 140 according to an embodiment of the disclosure may acquire first context data through the sensor 110. In addition, the processor 140 may receive second context data acquired by at least one other robot through the communication interface 130, and identify at least one context data as integrated context data among first context data and the second context data based on a collaboration scenario of the robot 100 and the other robot.

In addition, the processor 140 may acquire task information corresponding to the robot 100 based on the identified integrated context data and constant data of the robot 100. Here, the constant data may include at least one of identification information of the robot 100, specification information of the robot 100, function information of the robot 100, map information corresponding to a space in which the robot 100 is located, and priority information for each task.

In addition, the processor 140 may identify at least one context data corresponding to each of a plurality of elements among the first context data and the second context data based on types of a plurality of elements related to the collaboration scenario of the robot 100 and the other robots. Also, the processor 140 may acquire task information corresponding to the robot 100 by inputting integrated context data corresponding to each of the plurality of elements into a predetermined task allocation algorithm.

Here, the processor 140 may identify context data corresponding to each type of the plurality of elements based on at least one of an acquisition time, similarity, or emergency situation information of each of the first context data and the second context data.

Also, the plurality of elements may include at least one of type information of an external object, location information of the external object, location information of the robot 100, or emergency situation information.

In addition, the predetermined task allocation algorithm may be an algorithm including at least one of current task identification of the robot 100 and the other robots, situation identification of external objects, and cost identification of the robot 100 and the other robots for each task.

In addition, the processor 140 may control the communication interface 130 to transmit the first context data to at least one other robot, and control the communication interface 130 to transmit the identified integrated context data to at least one other robot when the integrated context data is identified.

In addition, when the integrated context data identified based on the collaboration scenario is received from at least one other robot, the processor may input integrated context data having a higher priority among the received integrated context data and the integrated context data identified by the robot 100 to the predetermined task allocation algorithm and acquire task information corresponding to the robot 100.

In addition, the processor 140 may control the communication interface 130 to transmit the first context data to at least one other robot, and identify whether the first context data is reflected in the received integrated context data when the integrated context data identified based on the collaboration scenario is received from the at least one other robot. When it is identified that the first context data is not reflected in the received integrated context data, the processor 140 may control the communication interface 130 to retransmit the first context data to at least one other robot.

In addition, when a signal indicating an occurrence of an error is received from the management server, the processor 140 may perform a task allocation function based on a predetermined collaboration scenario.

Meanwhile, a first other robot 200 and a second other robot 300 may also include a configuration included in the robot 100, and each configuration included in the first other robot 200 and the second other robot 300 may be the same as or similar to a function or operation of a configuration included in the robot 100, but is not limited thereto.

Referring back to FIG. 1, the processor 140 may acquire context data A through the sensor 110 at operation S10. Here, the context data A may include at least one of location information of the robot 100, information related to an external object, and emergency situation information, but is not limited thereto.

Specifically, the context data A may include data related to an event occurring at a specific location within a range that the robot 100 can sense through the sensor 110. For example, when the robot 100 provides a service corresponding to "serving", the context data A may include data corresponding to an "order" event occurring in the vicinity of the robot 100. In addition, when the robot 100 provides a service corresponding to "cleaning", the context data A may include data corresponding to a "pollution source occurrence" event occurring in the vicinity of the robot 100.

The processor 140 may receive a signal indicating the occurrence of an error from the management server through the communication interface 130 at operation S20. In addition, the processor 140 may control the communication interface 130 to transmit the context data A acquired through the sensor 110 to the first other robot 200 and the second other robot 300 based on receiving a signal indicating the occurrence of an error from the management server at operation S30.

In addition, the processor 140 may receive the context data acquired by at least one other robot 200 or 300 through the communication interface 130. Referring to FIG. 1, the processor 140 may receive context data B acquired from the first other robot 200 through the communication interface 130. Accordingly, the robot 100 may acquire data on an event occurred from at least one location within a range that the robot 100 and the first other robot 200 can sense through the sensor 110.

The processor 140 may identify one of the context data A acquired by the robot 100 based on the collaboration scenario of the robot 100 and at least one other robot and the context data B received from the first other robot 200. Specifically, the processor 140 may identify at least one context data corresponding to each of a plurality of elements among the context data A and the context data B based on the type of the plurality of elements related to the collaboration scenario of the plurality of robots 100, 200 and 300 at operation S40.

The collaboration scenario may refer to a scenario for minimizing a sum of costs for each task performed by the plurality of robots 100, 200 and 300, in the process of providing a service to the user by the plurality of robots 100, 200 and 300 in relation to at least one event occurring in a specific space, but is not limited thereto.

Here, the plurality of elements related to the collaboration scenario may include, but are not limited to, an element related to at least one of location information of the plurality of robots 100, 200 and 300, information related to an external object, or emergency information. For example, the processor 140 may identify context data corresponding to each type of the plurality of elements related to the collaboration scenario as integrated context data, based on at least one of an acquisition time of each of the context data A and the context data B, whether or not similarity or emergency information is included, but is not limited thereto.

The processor 140 according to an example may identify at least one context data related to the collaboration scenario as integrated context data based on a similarity of at least one context data with respect to one element among the plurality of elements related to the collaboration scenario. For example, when the at least one context data includes data related to an event corresponding to "external object identification", the processor 140 may identify integrated context data including at least one context data having a high similarity with other context data among at least one context data in relation to an element related to a collaboration scenario called "type of external object".

More specifically, when the processor 140 identifies integrated context data based on a total of three context data, two context data may include data corresponding to "type of external object: human", and when the remaining one context data includes data corresponding to "type of external object: obstacle", the processor 140 may identify the integrated context data based on the type of external object being "human".

However, when there is a possibility that an emergency situation has occurred, since the robot 100 is required to provide a service corresponding to the emergency situation preferentially, the processor 140 may identify the integrated context data based on the corresponding context data, when emergency situation information is included in the context data corresponding to "type of external object: obstacle", which has a low similarity to other context data. Accordingly, the processor 140 may identify the integrated context data based on the emergency caused by the obstacle.

In addition, when the integrated context data cannot be identified based on the similarity of each of the context data, the processor 140 may identify the integrated context data based on the most recently acquired context data. For example, when the processor 140 identifies the integrated context data based on a total of two context data, a firstly acquired context data may include data corresponding to "location of external object: aisle", when the context data acquired later includes data corresponding to "location of external object: door", the processor 140 may identify the integrated context data based on the user being located near the door.

The processor 140 may control the communication interface 130 to transmit the identified integrated context data to the first other robot 200 and the second other robot 300 at operation S50. In addition, the processor 140 may acquire task information corresponding to the robot 100 by inputting constant data and integrated context data to the task allocation algorithm at operation S70.

Here, the constant data may include at least one of identification information of the robot 100, specification information of the robot 100, function information of the robot 100, map information corresponding to a space in which the robot 100 is located, and priority information for each task, but is not limited thereto, and any data that does not change regardless of an event occurring in space may be included in the constant data. The constant data may be stored in a memory included in the plurality of robots 100, 200 and 300, and may use, if necessary, the constant data integrated by transmitting and receiving constant data between the plurality of robots 100, 200 and 300.

The task allocation algorithm according to an example may be an algorithm including at least one of current task identification of the robot 100 and at least one other robot 200 or 300, identification of an external object situation, and a cost identification for each task of the plurality of robots 100, 200 and 300. The task allocation algorithm may be stored in the memory included in the plurality of robots 100, 200 and 300, and the plurality of robots 100, 200 and 300 may communicate, if necessary, with an external server to update a pre-stored task allocation algorithm with a new task allocation algorithm.

The processor 140 according to an example may identify a current task of the robot 100 through the task allocation algorithm and check a situation related to an external object. In addition, the processor 140 may acquire task information corresponding to a task suitable to be performed by the robot 100 to minimize the sum of costs for each task performed by the plurality of robots 100, 200 and 300 in relation to the collaboration scenario of the plurality of robots 100, 200 and 300.

Specifically, the processor 140 may input integrated context data corresponding to a situation in which the robot 100 performs a "serving" task, the first other robot 200 performs a "clean up plates" task, and an event "empty plate is discovered" occurs near the robot 100, and constant data into the task allocation algorithm. The empty plate is located closer to the robot 100 than the first other robot 200, rather than the robot 100 performing the serving task collects empty plates, collecting empty plates by the first other robot 200 performing a cleaning up task may be more suitable for the collaboration scenario of the plurality of robots 100, 200 and 300, the processor 140 may acquire information on the task of collecting empty plates as task information on the first other robot 200 through the task allocation algorithm.

Also, the processor 140 may provide a service to the user based on the acquired task information at operation S80. Specifically, the processor 140 may control the driver 120 to perform an operation corresponding to the service to be provided to the user by the robot 100 based on the task information.

The operation of identifying integrated context data and acquiring task information described above of the robot 100 may be repeated. According to one example, the processor 140 may provide a service based on new task information by re-identifying the integrated context data after a predetermined time has elapsed after acquiring the task information, and acquiring new task information based thereon. However, this is only an example, and the processor 140 may perform integrated context data identification and task information acquisition operation based on information related to an important event included in the context data A newly acquired by the robot 100.

Meanwhile, the first other robot 200 according to an embodiment of the disclosure may also acquire the context data B like the robot 100 at operation S11. When a problem occurs in the management server, the first other robot 200 may receive a signal indicating the occurrence of an error from the management server at operation S21.

In addition, the first other robot 200 may receive the context data A from the robot 100, and transmit the context data B acquired by itself to the robot 100 and the second other robot 300 at operation S31.

The first other robot 200 may identify at least one context data of the context data B acquired by the first other robot 200 based on the collaboration scenario of the plurality of robots 100, 200 and 300 and the context data A received from the robot 100 as integrated context data.

However, when the first other robot 200 receives integrated context data from the other robot 100 other than the first other robot 200 before identifying the integrated context data, the first other robot 200 may identify whether the context data acquired by the first other robot 200 is reflected in the received integrated context data at operation S51.

Specifically, when data corresponding to a plurality of elements included in the context data B acquired by the first other robot 200 is not included in the integrated context data in relation to a plurality of elements related to the collaboration scenario of the plurality of robots 100, 200 and 300 at all, the first other robot 200 may identify that the context data acquired by the first other robot 200 is not reflected in the integrated context data at operation S51: N. Meanwhile, when the integrated context data includes at least some data corresponding to the plurality of elements included in the context data B acquired by the first other robot 200, the first other robot 200 may identify that the context data acquired by the first other robot 200 is reflected in the integrated context data at operation S51: Y.

When it is identified that the context data acquired by the first other robot 200 is not reflected in the integrated context data, the first other robot 200 may retransmit the context data (B) acquired by itself to the robot 100 that has transmitted the integrated context data to the first other robot at operation S61. Accordingly, the context data (B) retransmitted from the first other robot 200 may be considered in the process of the robot 100 re-identifying the integrated context data thereafter.

When the first other robot 200 retransmit the context data (B) acquired by itself to the robot 100 at operation S61 or the context data acquired by the first other robot 200 is reflected in the integrated context data at operation S51: Y, task information may be acquired by inputting the integrated context data and constant data received from the robot 100 to the task allocation algorithm at operation S71.

Also, the first other robot 200 may provide a service to the user based on the acquired task information at operation S81.

Meanwhile, the second other robot 300 according to an embodiment of the disclosure may be a robot that does not acquire context data, unlike the robot 100 and the first other robot 200. Specifically, the second other robot 300 is a robot in a standby state rather than in a state that provides a service to the user, and may not acquire context data through the sensor 110.

The second other robot 300 may receive a signal indicating an occurrence of an error from the management server at operation S22. And, the second other robot 300 may receive a plurality of context data A and B from the robot 100 and the first other robot 200.

Also, the second other robot 300 may identify integrated context data related to the collaboration scenario based on the received plurality of context data at operation S41. Specifically, the second other robot 300 may identify at least one context data corresponding to each of the plurality of elements related to the collaboration scenario of the plurality of robots 100, 200 and 300 among the context data A received from the robot 100 and the context data B received from the first other robot 200, as the integrated context data.

In addition, the second other robot 300 may identify context data having a higher priority among the integrated context data received from the robot 100 and the integrated context data identified by the second other robot 300 at operation S52. Since the identification method of the context data A and B used by the robot 100 and the second other robot 300 to identify the integrated context data, and the integrated context data is the same, the integrated context data received from the robot 100 and the integrated context data identified by the second other robot 300 may include exactly the same data.

However, the second other robot 300 may identify one integrated context data based on a priority between the integrated context data received from the robot 100 and the integrated context data identified by the second other robot 300 to identify one integrated context data to be input to the task allocation algorithm.

When a time point at which the integrated context data is received from the robot 100 is earlier than a time point at which the second other robot 300 identifies the integrated context data by itself, the second other robot 300 may identify the integrated context received from the robot 100 has a higher priority. Meanwhile, when a time point at which the second other robot 300 identifies the integrated context data by itself is earlier than a time point of receiving the integrated context data from the robot 100, the second other robot 300 may identify the integrated context data identified by the second other robot 300 has a higher priority.

In addition, the second other robot 300 may acquire task information by inputting constant data and context data identified as having a higher priority to the task allocation algorithm at operation S72.

Also, the second other robot 300 may provide a service to the user based on the acquired task information at operation S82.

As described above, the plurality of robots 100, 200 and 300 utilize the same integrated context data and the same task allocation algorithm to acquire task information corresponding to each robot and provide a service, such that in the collaboration scenario of the plurality of robots 100, 200 and 300, a task suitable for each robot may be assigned to each robot without overlapping tasks, thereby improving user convenience.

Figure 3A:
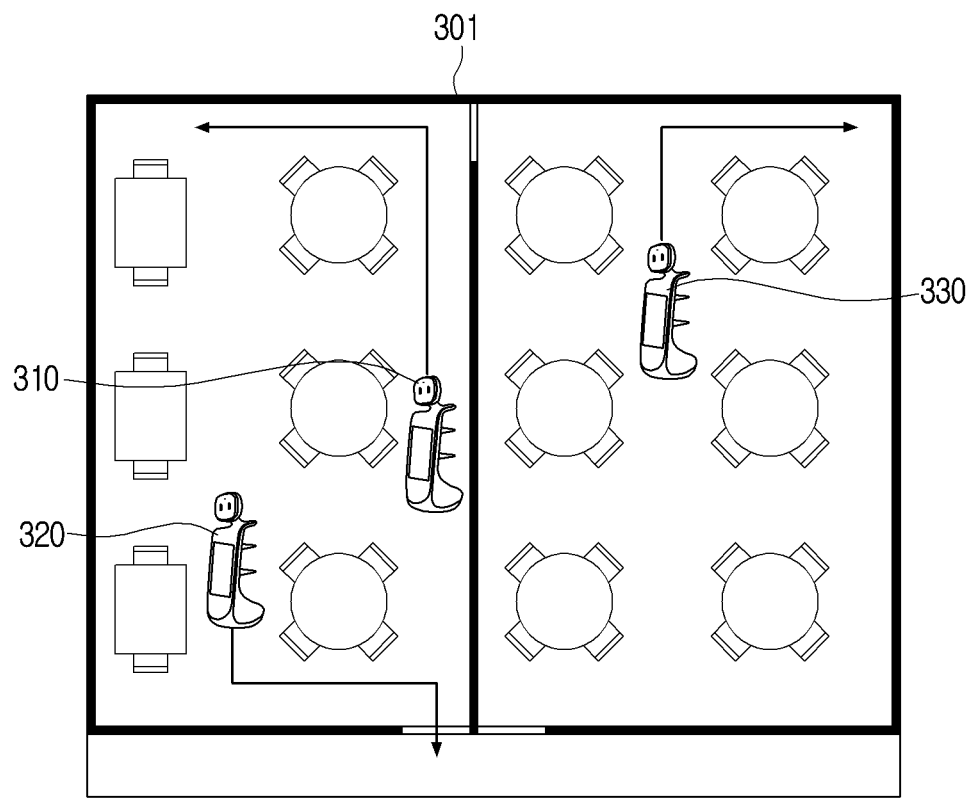
FIGS. 3A, 3B, and 3C are views illustrating a collaboration between a plurality of robots according to various embodiments of the disclosure.
Figure 3A:
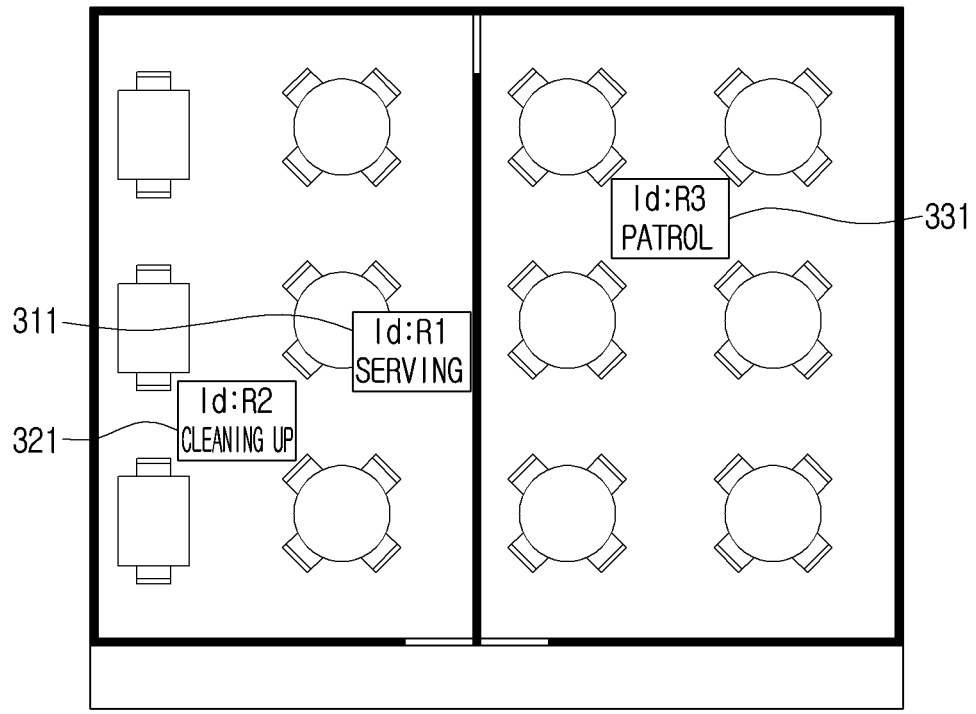
Figure 3B:
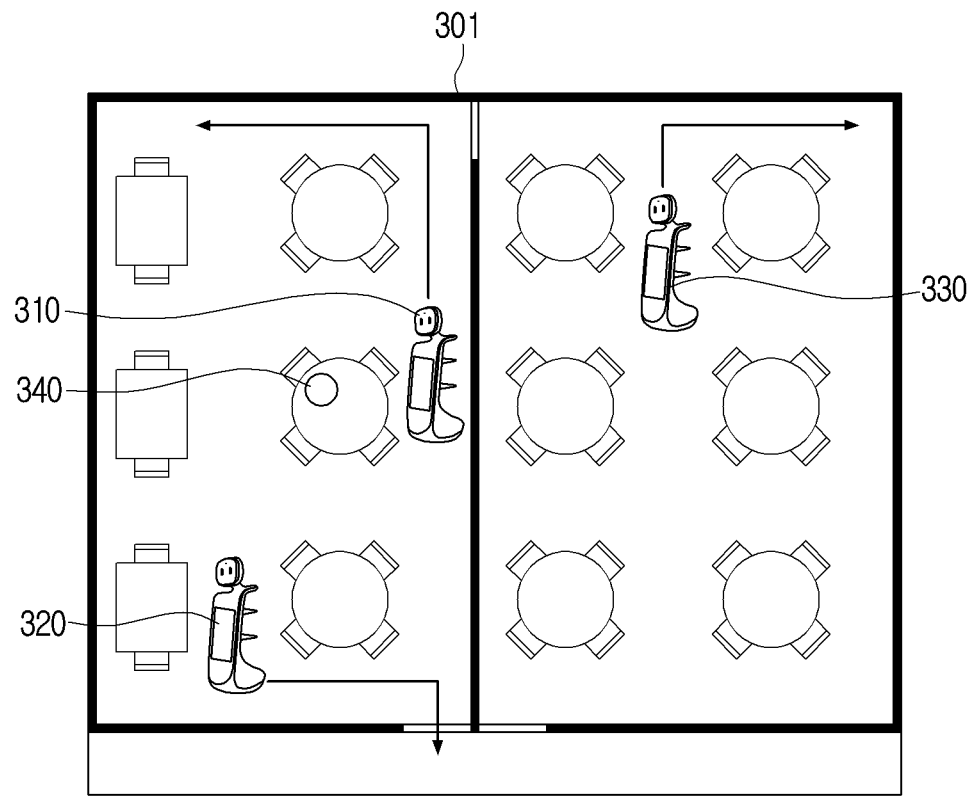
Figure 3B:
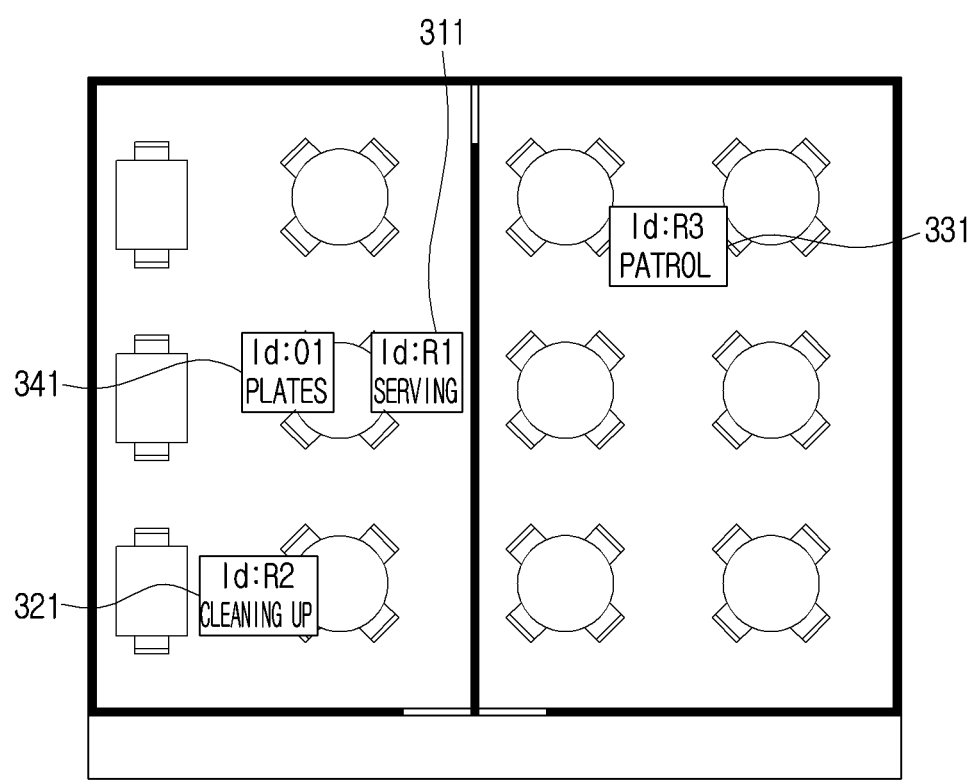
Figure 3C:
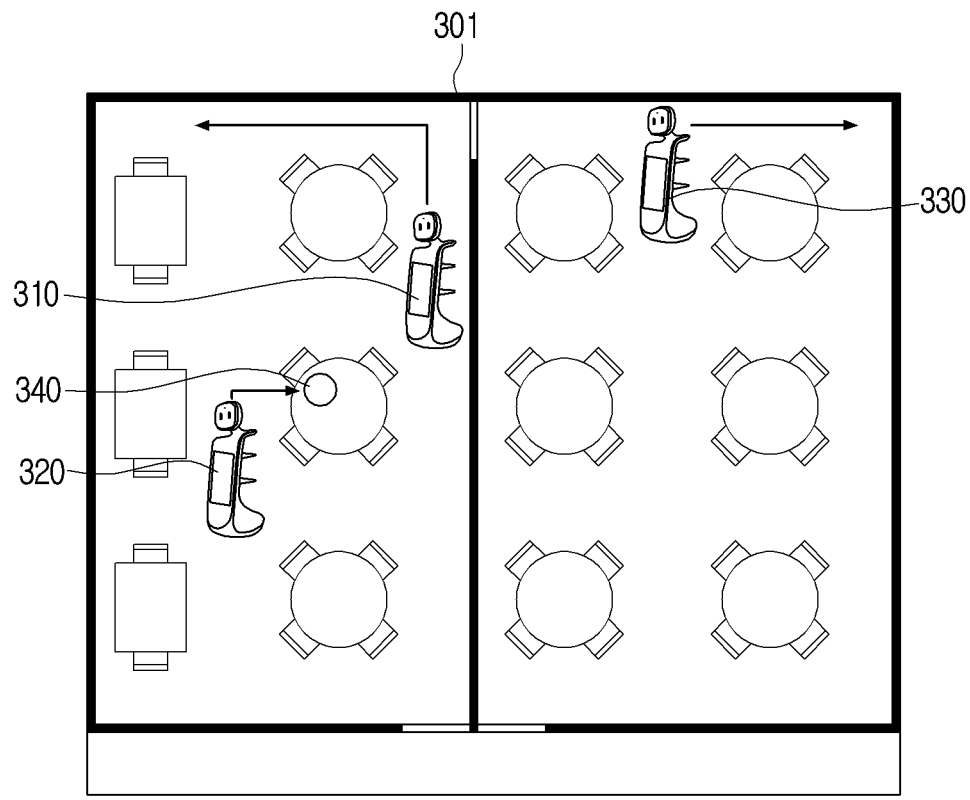
Figure 3C:
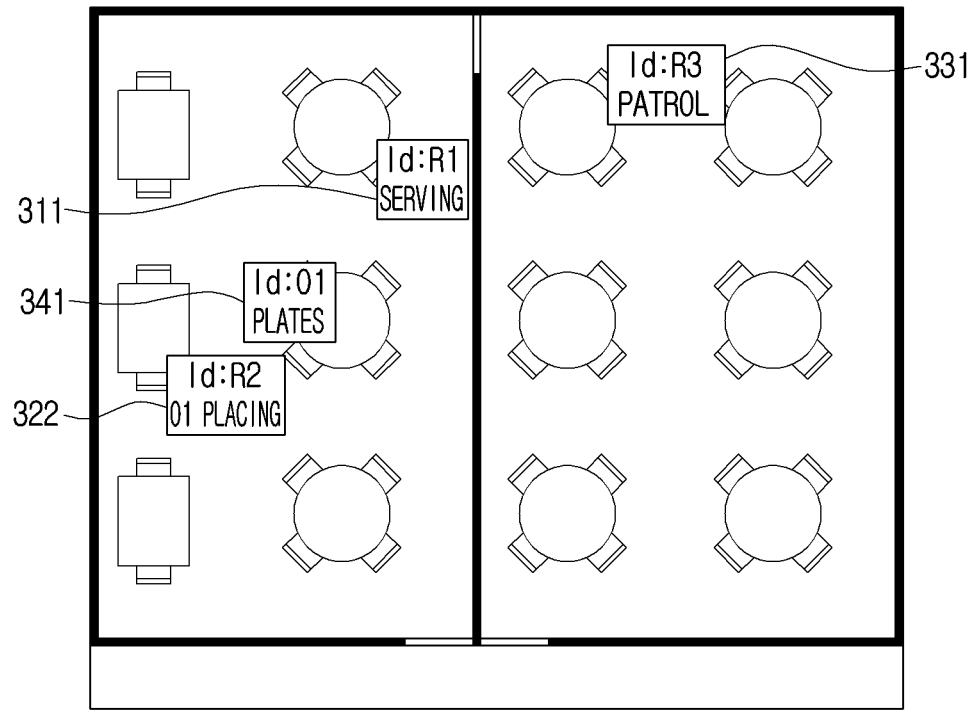

FIGS. 3A, 3B, and 3C are views illustrating a collaboration between a plurality of robots according to various embodiments of the disclosure.

Referring to FIG. 3A, the plurality of robots 310, 320, and 330 disposed in a restaurant 301 may provide a service based on a collaboration scenario. For example, a robot 1 310 may perform serving 311, a robot 2 320 may perform cleaning up 321, and a robot 3 330 may perform a task corresponding to patrol 331.

The plurality of robots 310, 320, and 330 may store constant data including identification data, and context data including location information of each robot and data related to an external object, respectively. Here, the context data stored by each robot may include continuously updated data.

The plurality of robots 310, 320, and 330 may share the stored constant data and context data with each other. Accordingly, all of the plurality of robots 310, 320, and 330 may share location information of each robot and information related to an external object.

The robot 2 320 may acquire task information corresponding to the robot 2 320 by inputting the integrated context data into the task allocation algorithm. Specifically, the robot 2 320 may acquire task information of performing cleaning up the plate 340 by the robot 2 320 itself, and may perform cleaning up task based on the acquired task information, based on a current task identification of each of the plurality of robots 310, 320 and 330, a situation identification of an external object (e.g., plate 340), and an identification of a cost of each task of the plurality of robots 310, 320 and 330. Even if the robot 1 310 is located closer to the plate 340 than the robot 2 320, the robot 2 320 currently performing the cleaning up, continues to perform the cleaning up the plate 340 may minimize a sum of costs for each task of the robots 310, 320 and 330

Referring to FIG. 3B, the robot 1 310 for providing a service in the restaurant 301 may identify a plate 340. In this case, the robot 1 310 may identify the plate 340 disposed on a table where the user is not located as an empty plate, and acquire context data 341 of content identifying the plate 340 as an object of a plate to be cleaned up.

Here, the robot 2 320 may acquire integrated context data based on context data 341 received from robot 1 310 and context data acquired by itself.

Referring to FIG. 3C, the robot 2 320 may acquire task information corresponding to the robot 2 320 by inputting the integrated context data into the task allocation algorithm. Specifically, the robot 2 320 may acquire task information of performing placing the plate 340 by the robot 2 320 itself, and may perform the placing task 322 based on the acquired task information, based on a current task identification of each of the plurality of robots 310, 320 and 330, a situation identification of an external object (e.g., plate 340), and an identification of a cost of each task of the plurality of robots 310, 320 and 330. Even if the robot 1 310 is located closer to the plate 340 than the robot 2 320, the robot 2 320 currently performing the cleaning up, continues to perform the cleaning up the plate 340 may minimize a sum of costs for each task of the robots 310, 320 and 330.

Figure 4A:
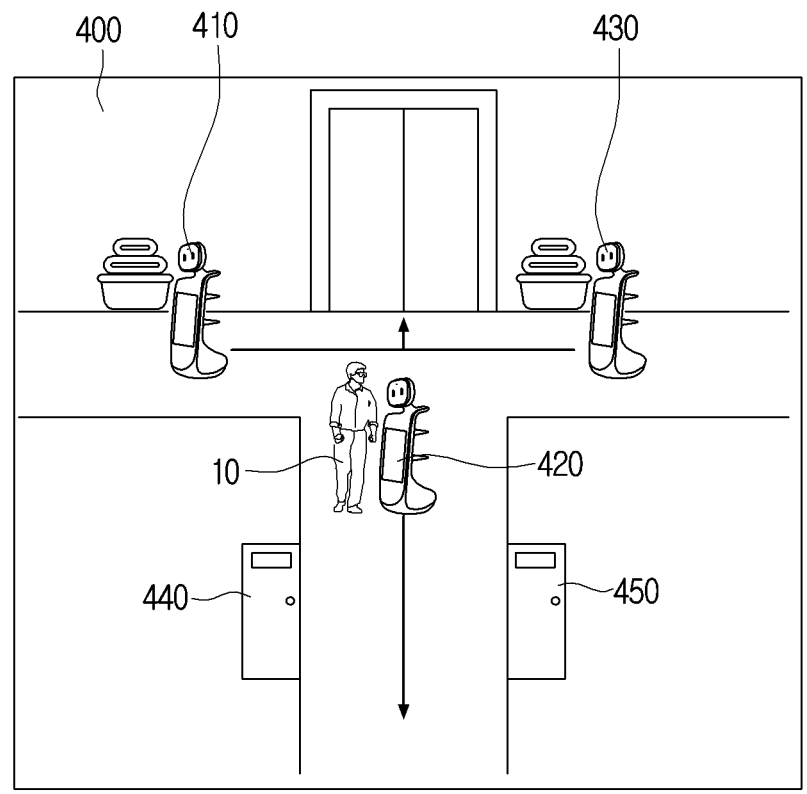
FIGS. 4A, 4B, and 4C are views illustrating a collaboration between a plurality of robots according to various embodiments of the disclosure.
Figure 4A:
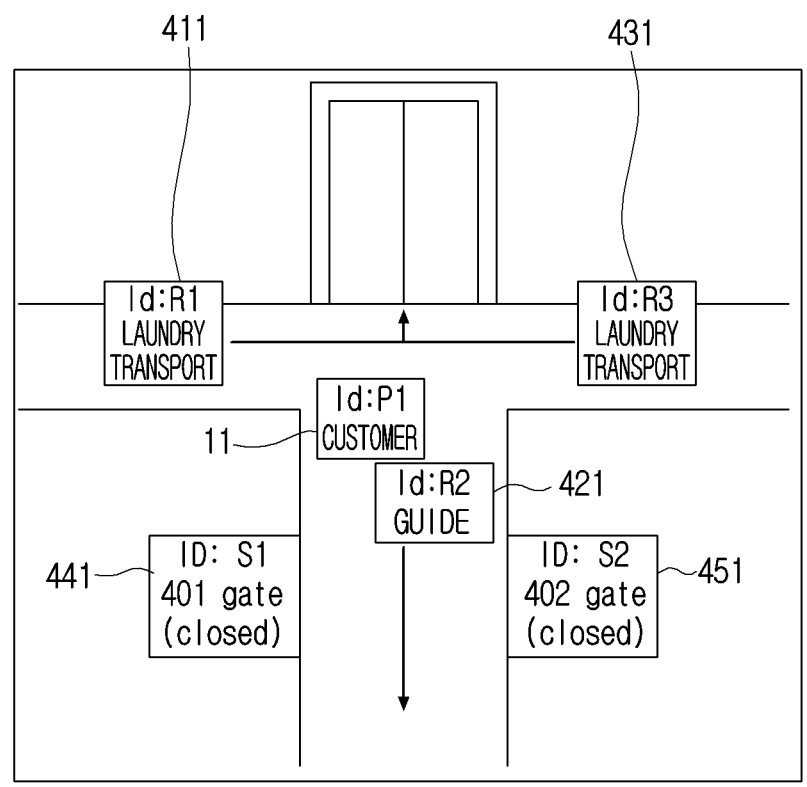
Figure 4B:
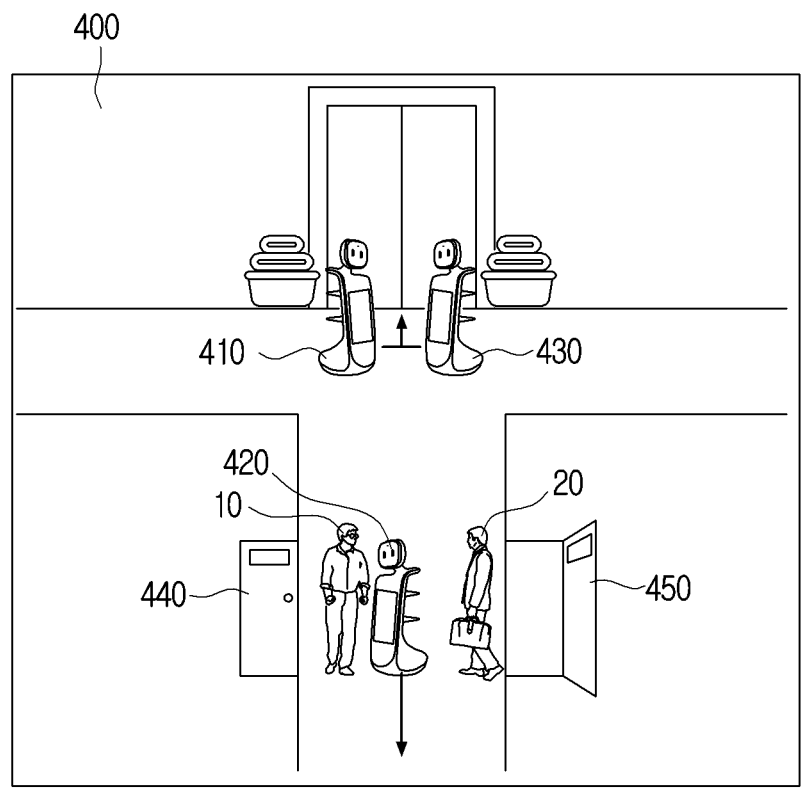
Figure 4B:
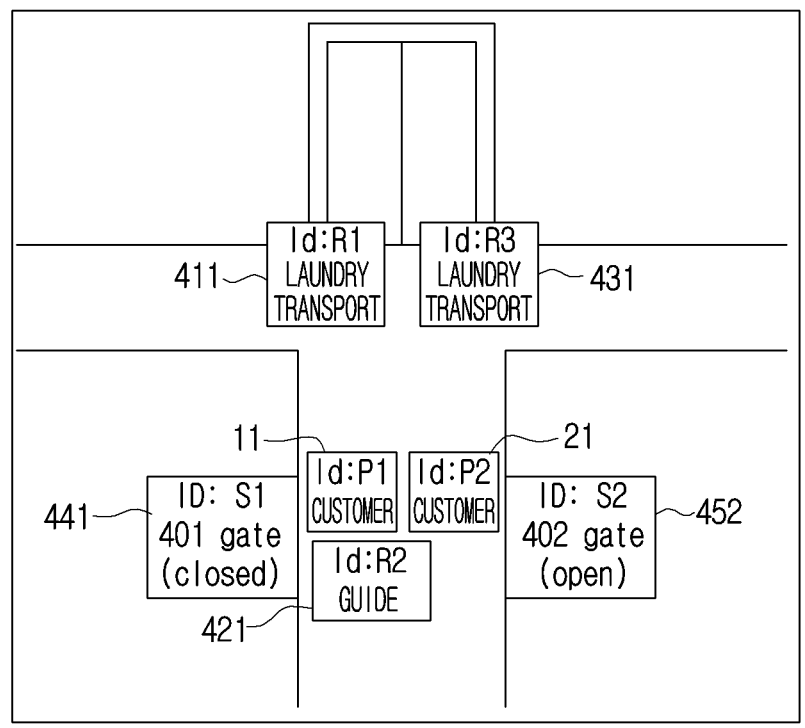
Figure 4C:
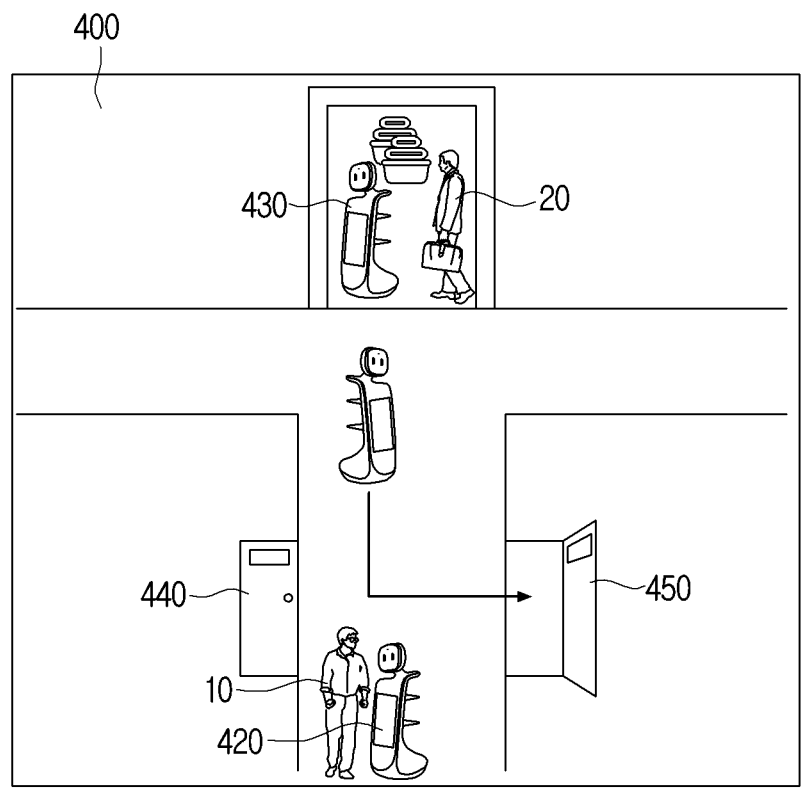
Figure 4C:
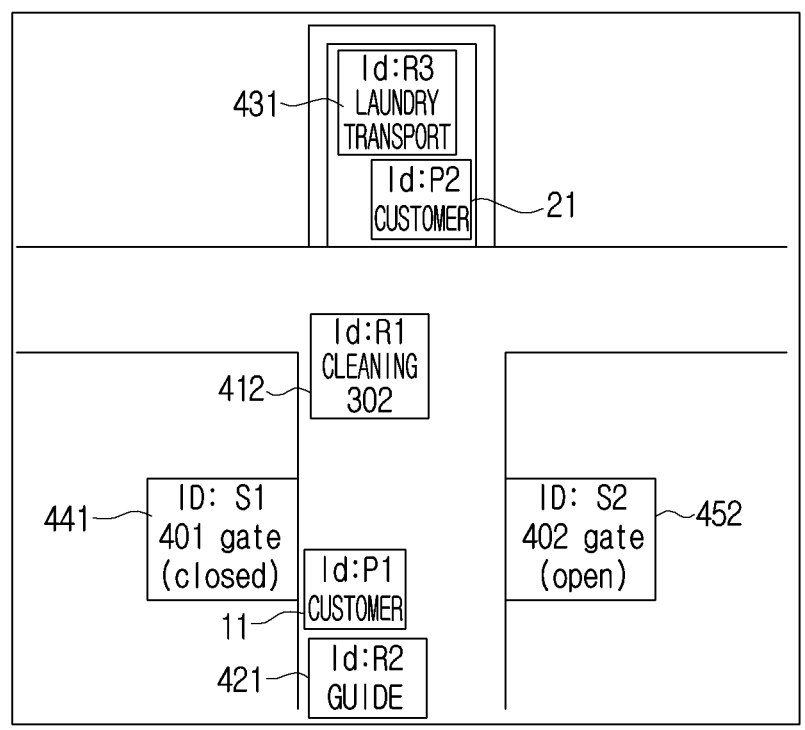

FIGS. 4A, 4B, and 4C are views illustrating a collaboration between a plurality of robots according to various embodiments of the disclosure.

Referring to FIG. 4A, a plurality of robots 410, 420, and 430 disposed in a hotel 400 may provide a service based on a collaboration scenario. For example, a robot 1 410 may perform a task corresponding to laundry transport 411, a robot 2 420 may perform a guide 421, and a robot 3 430 may perform a task corresponding to laundry transport 431.

The plurality of robots 410, 420, and 430 may acquire context data with respect to structures 440 and 450 located in the hotel 400, and a first user 10. For example, robots of the plurality of robots 410, 420, and 430 may acquire and share information 11 about the first user receiving service from the robot 2 420, and information 441 and 451 that doors 440 and 450 of rooms 401 and 402 are currently closed.

Referring to FIG. 4B, the robot 2 420 may acquire context data including information 452 that the door 450 of room 402 has been changed to an open state and information 21 about the second user 20, and transmit the acquired context data to the robot 1 410 and the robot 3 430. According to another embodiment, the robot 2 420 may acquire integrated context data based on context data received from the robot 1 410 and the robot 3 430 and context data acquired by itself, and transmit the acquired integrated context data to the robot 1 410 and the robot 3 430.

Referring to FIG. 4C, the plurality of robots 410, 420, and 430 may acquire integrated context data based on the context data received from the other robots and the context data acquired by themselves, and input the acquired integrated context data to the task allocation algorithm to acquire task information corresponding to each robot.

Although the robot 2 420 is a robot located closest to the room 402, which is a target of a cleaning task due to an exit of the second user 20, since the robot 2 420 is currently performing a guide task for the first user 10, the robot 1 410 may be identified as a robot corresponding to the cleaning task for the room 402 450.

Therefore, as a result of inputting the integrated context data into the task allocation algorithm, the robot 1 410 may acquire task information 412 corresponding to the cleaning task for the room 402 450, and perform cleaning task based on the acquired task information. Also, the robot 2 420 may continue the existing guide task.

In addition, the robot 3 430 may input the integrated context data into the task allocation algorithm to acquire task information of transporting laundry at once by taking over the laundry carried by the robot 1 410, and continue the existing laundry transport task based on the acquired task information.

Figure 5A:
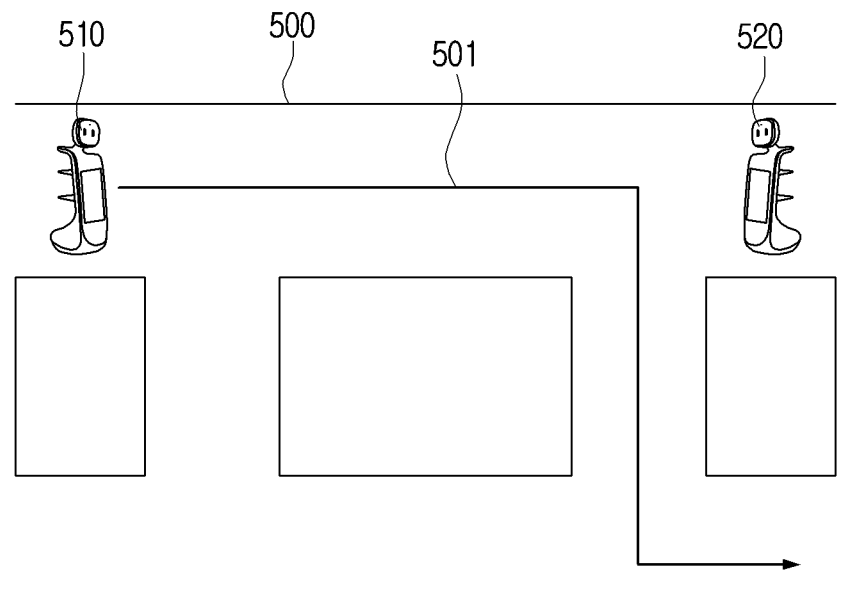
FIGS. 5A, 5B, and 5C are views illustrating a collaboration between a plurality of robots according to various embodiments of the disclosure.
Figure 5A:
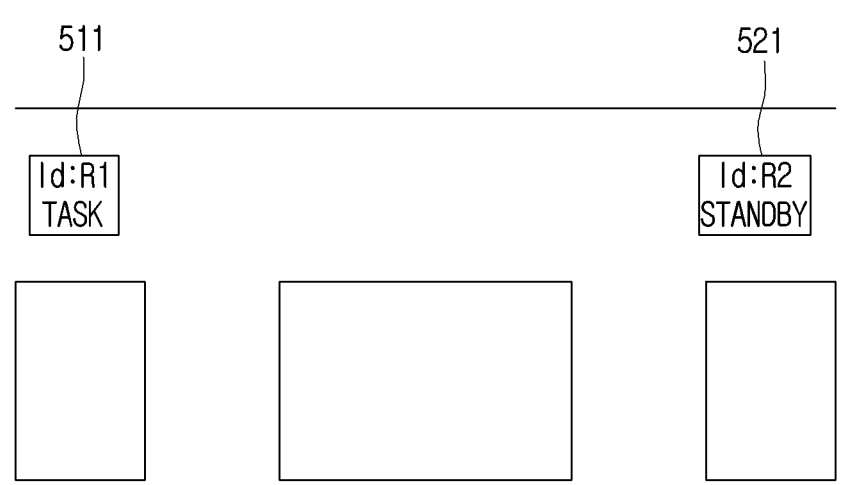
Figure 5B:
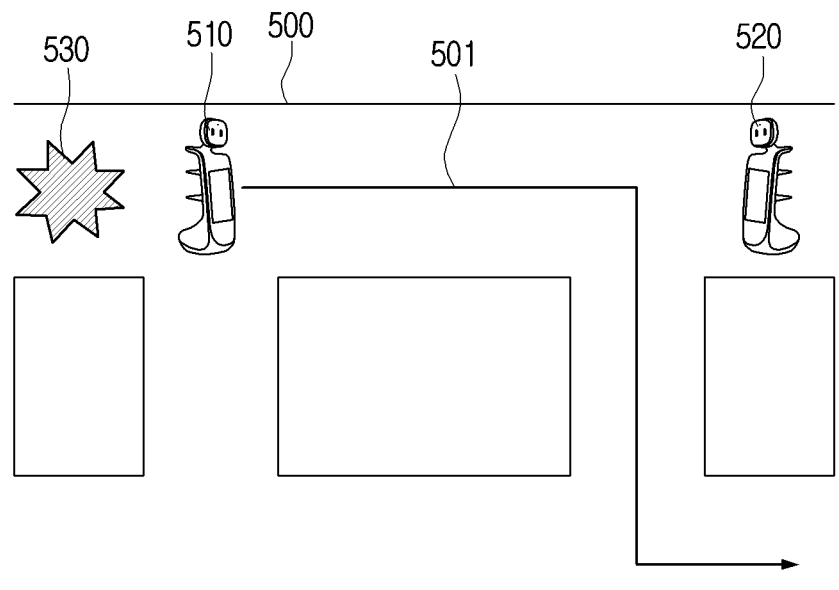
Figure 5B:
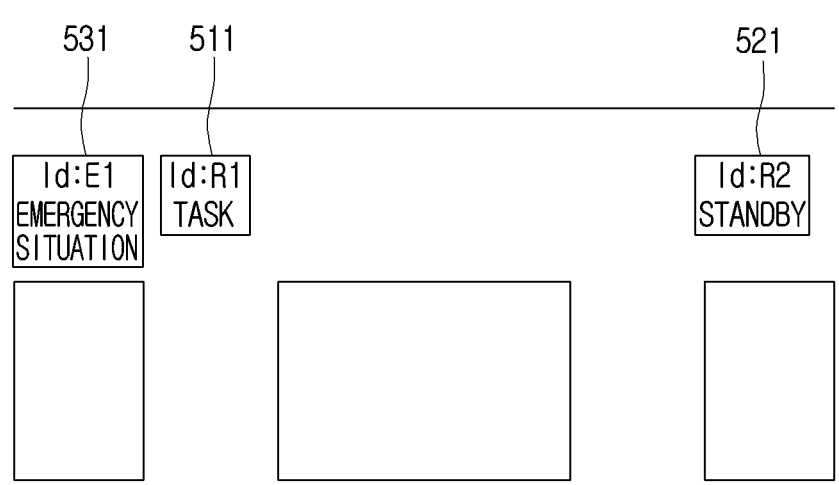
Figure 5C:
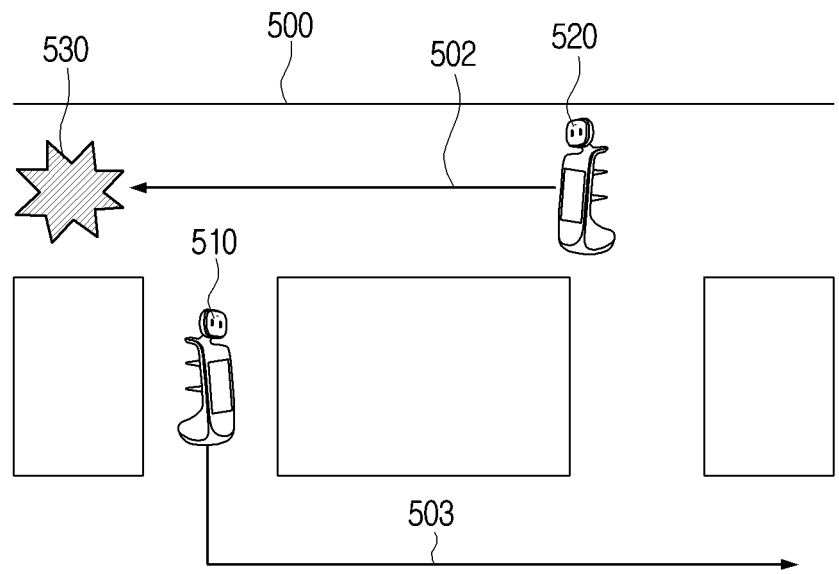
Figure 5C:
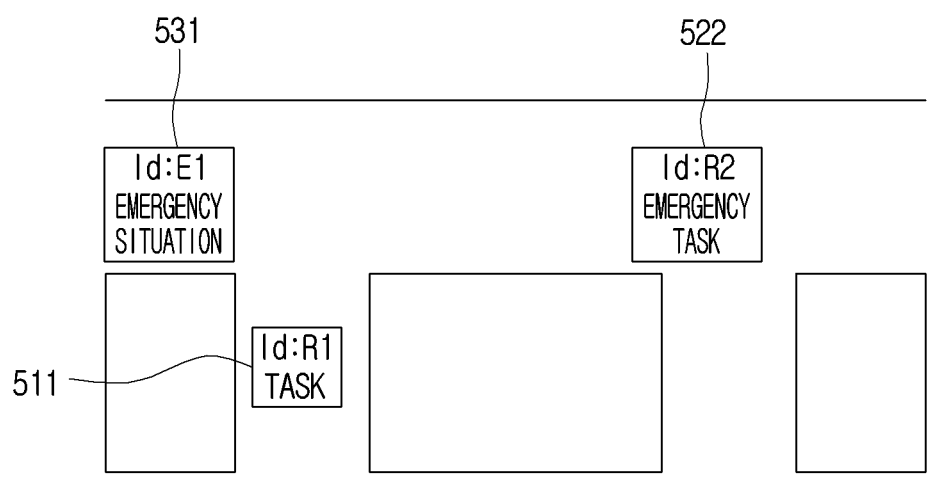

FIGS. 5A, 5B, and 5C are views illustrating a collaboration between a plurality of robots according to various embodiments of the disclosure.

Referring to FIG. 5A, a plurality of robots 510 and 520 disposed in a corridor 500 may provide a service based on a collaboration scenario. For example, a robot 1 510 performing a normal task 511 may move along a route 501 acquired based on task information corresponding to the normal task. Meanwhile, a robot 2 520 may be in a standby state 521.

Referring to FIG. 5B, the robot 1 510 performing a normal task may acquire context data 531 corresponding to an emergency situation 530 occurring on one side of the corridor 500. The robot 1 510 may transmit the acquired context data 531 to the robot 2 520. Since the context data 531 received from the robot 1 510 includes emergency situation information, the robot 2 520 may acquire integrated context data including information on the emergency situation 530 based on the context data received from the robot 1 510.

Referring to FIG. 5C, the robot 2 520 may input integrated context data including information on emergency situation 530 and constant data of each robot 510 and 520 into a task allocation algorithm to acquire task information corresponding to the robot 2 520. For example, if the specification or function of the robot 2 520 is more suitable to cope with the emergency situation 530 than the specification or function of the robot 1 510, the robot 2 520 may perform an emergency task 522 corresponding thereto by being assigned a task for handling the emergency situation 530 in preference to the robot 1 510 close to a point where the emergency situation 530 occurs.

More specifically, the task information corresponding to the robot 2 520 may include information about the route 502 on which the robot 2 520 will move to a point where the emergency situation 530 occurs, and the robot 2 520 may input constant data including priority information for each task and integrated context data to the task allocation algorithm, and acquire task information including information about a shortest route 502 moving from a location of the robot 2 520 to the point where the emergency situation 530 occurs.

In addition, the robot 1 510 may continue the existing normal task 511 based on task information acquired by inputting the integrated context data and constant data acquired by itself or received from robot 2 520 into the task allocation algorithm. However, since the normal task 511 to be performed by the robot 1 510 is a task with a lower priority than the emergency task 522 to be performed by the robot 2 520, the movement route of the robot 1 510 may be changed from the existing route 501 to a route 503.

As such, the plurality of robots 510 and 520 disposed in the corridor 500 may provide optimal services to the user based on a collaboration scenario in which a robot 520 suitable for handling the emergency situation 530 can move quickly.

Figure 6:
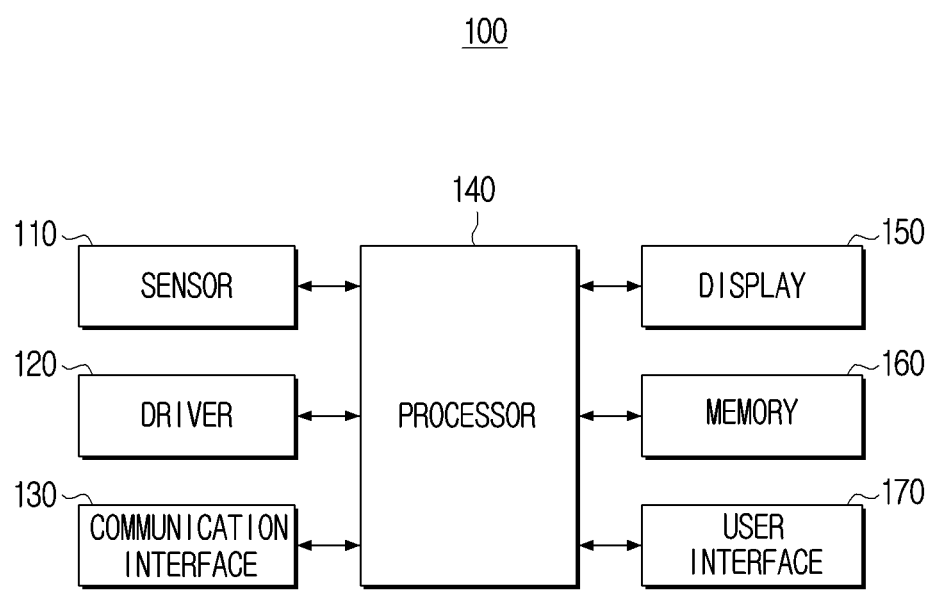
FIG. 6 is a view illustrating detailed description of a functional configuration of a robot according to an embodiment of the disclosure.

FIG. 6 is a view illustrating a detailed description of a functional configuration of a robot according to an embodiment of the disclosure.

Referring to FIG. 6, the robot 100 may include a sensor 110, a driver 120, a communication interface 130, a processor 140, a display 150, a memory 160, and a user interface 170. Among the configurations shown in FIG. 6, detailed descriptions of configurations overlapping those shown in FIG. 2 will be omitted.

The display 150 may be implemented in various forms of display such as a liquid crystal display (LCD), organic light emitting diode (OLED) display, active matrix-OLED (AM-OLED), plasma display panel (PDP), and so on. The display 150 may include a driving circuit, a backlight unit, and the like which may be implemented in forms such as an a-si thin-film transistor (TFT), a low temperature poly silicon (LTPS) TFT, an organic TFT (OTFT), and the like. The display 150 may be realized as a plasma display panel (PDP), a liquid crystal display (LCD), an organic light emitting diode (OLED), a flexible display, a 3-dimensional (3D) display, or the like.

The display 150 according to an example may display information related to a service provided by the robot 100 or a user interface (UI) including the information.

The memory 160 may store data necessary for various embodiments of the disclosure. The memory 160 may be implemented with a memory embedded in a memory, or may be implemented with a memory in the form of detachable to the robot 100. For example, the robot 100 for the data for driving the robot 100 may be stored in the embedded memory and the memory detachable to the robot 100 when the data for extension of the robot 100. Meanwhile, the memory embedded in the robot 100 may be implemented with at least one of volatile memory (e.g., dynamic RAM (DRAM), static RAM (SRAM), a synchronous dynamic RAM (SDRAM), etc.), non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), hard drive, or solid-state drive (SSD). In addition, the memory detachable to the robot 100 may be implemented with a memory card (e.g., compact flash (CF), secure digital (SD), micro secure digital (Micro-SD), mini secure digital (Mini-SD), extreme digital (xD), multi-media card (MMC), etc.), external memory that can be connected to a USB port (e.g., USB memory).

The memory 160 according to an example may store at least one of constant data corresponding to at least one robot among a plurality of robots and context data acquired by the robot 100 or context data received from the other robot. In addition, the memory 160 may store a predetermined task allocation algorithm and task information acquired by inputting constant data and context data to the task allocation algorithm.

The user interface 170 is a configuration in which the robot 100 is involved in performing an interaction with the user. For example, the user interface 170 may include at least one of a touch sensor, a motion sensor, a button, a jog dial, a switch, a microphone, and a speaker, but is not limited thereto.

FIG. 7 is a flowchart illustrating a control method according to an embodiment of the disclosure.

Referring to FIG. 7, the control method may acquire first context data through a sensor at operation S710.

Second context data acquired by at least one other robot may be received at operation S720.

At least one of the first context data and the second context data may be identified based on a collaboration scenario of the robot and the other robot at operation S730.

Task information corresponding to the robot may be acquired by inputting at least one identified context data to a predetermined task allocation algorithm related to collaboration at operation S740.

Finally, the robot may be driven based on the acquired task information at operation S750.

Here, the acquiring task information at operation S740 may include acquiring task information corresponding to the robot based on the at least one identified context data and constant data of the robot, and the constant data may include at least one of identification information of the robot, specification information of the robot, function information of the robot, map information corresponding to a space in which the robot is located, and priority information for each task.

In addition, the identifying the context data at operation S730 may include identifying at least one context corresponding to each of the plurality of elements among the first context data and the second context data based on types of a plurality of elements related to the collaboration scenario of the robot and the other robot, and the acquiring the task information at operation S740 includes inputting at least one context data corresponding to each of the plurality of elements to a predetermined task allocation algorithm to acquire task information corresponding to the robot.

Here, the identifying the context data at operation S730 may include context data corresponding to each type of the plurality of elements based on at least one of an acquisition time of each of the first context data and the second context data, whether there is a similarity, or whether emergency information is included Also, the plurality of elements may include at least one of type information of an external object, location information of an external object, location information of a robot, or emergency situation information.

In addition, a predetermined task allocation algorithm may be an algorithm including at least one of current task identification of the robot and the other robot, state identification of the external object, and cost identification of the robot and the other robot for each task.

In addition, a method for controlling may further include transmitting the first context data to at least one other robot and transmitting, based on at least one context data being identified, the at least one identified context data to at least one other robot.

In addition, the control method may further include, when the context data identified based on the collaboration scenario is received from at least one other robot, inputting the context data having a higher priority among the received context data and the at least one identified context data to a predetermined task allocation algorithm.

In addition, the control method may further include transmitting first context data to at least one other robot, identifying whether the first context data is reflected in the received context data when the identified context data is received based on the collaboration scenario from at least one other robot, and retransmitting the first context data to at least one other robot when the first context data is not reflected in the received context data.

In addition, the identifying the context data at operation S730 may include identifying at least one context data when a signal indicating an occurrence of an error is received from the management server.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

Various embodiments described above may be embodied in a recording medium that may be read by a computer or a similar apparatus to the computer by using software, hardware, or a combination thereof. In some cases, the embodiments described herein may be implemented by the processor 140 itself. In a software configuration, various embodiments described in the specification such as a procedure and a function may be embodied as separate software modules. The software modules may respectively perform one or more functions and operations described in the specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the non-transitory computer-readable medium may be compact disc (CD), digital video disc (DVD), a hard disk, Blu-ray disc, USB, a memory card, ROM, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
    a sensor; a driver;
    a communication interface; and
    a processor configured to:
        receive, from a management server, a signal indicating that an error has occurred in the management server,
        acquire first context data through the sensor,
        receive second context data acquired by at least one other robot through the communication interface,
        identify at least one context data of the first context data and the second context data based on a collaboration scenario of the robot and the at least one other robot,
        input the identified at least one context data to a predetermined task allocation algorithm related to the collaboration scenario to acquire task information corresponding to the robot, and
        control the driver based on the acquired task information, and
    wherein the processor is further configured to, based on the signal indicating that the error has occurred in the management server, perform a task allocation function based on the collaboration scenario.

2. The robot of claim 1,
    wherein the processor is further configured to, based on the identified at least one context data and constant data of the robot, acquire the task information corresponding to the robot, and
    wherein the constant data includes at least one of identification information of the robot, specification information of the robot, function information of the robot, map information corresponding to a space where the robot is located, or priority information for each task.

3. The robot of claim 1, wherein the processor is further configured to:
    based on types of a plurality of elements related to the collaboration scenario of the robot and the at least one other robot, identify the at least one context data corresponding to each of the plurality of elements among the first context data and the second context data, and
    input the at least one context data corresponding to each of the plurality of elements into the predetermined task allocation algorithm to acquire the task information corresponding to the robot.

4. The robot of claim 3, wherein the processor is further configured to identify the at least one context data corresponding to each type of the plurality of elements based on at least one of an acquisition time point of each of the first context data and the second context data, whether there is a similarity, or whether emergency situation information is included.

5. The robot of claim 3, wherein the plurality of elements include at least one of type information of an external object, location information of the external object, location information of the robot, or emergency situation information.

6. The robot of claim 1, wherein the predetermined task allocation algorithm includes at least one of a current task identification of the robot and the at least one other robot, a situation identification of an external object, or a cost identification for each task of the robot and the at least one other robot.

7. The robot of claim 1, wherein the processor is further configured to:
    control the communication interface to transmit the first context data to the at least one other robot, and
    based on the at least one context data being identified, control the communication interface to transmit the identified at least one context data to the at least one other robot.

8. The robot of claim 1, wherein the processor is further configured to, based on third context data identified based on the collaboration scenario being received from the at least one other robot, input context data having a higher priority among the received third context data and the identified at least one context data into the predetermined task allocation algorithm to acquire the task information corresponding to the robot.

9. The robot of claim 1, wherein the processor is further configured to:
    control the communication interface to transmit the first context data to the at least one other robot,
    based on third context data identified based on the collaboration scenario being received from the at least one other robot, identify whether the first context data is reflected in the received third context data, and based on the first context data identified as not being reflected in the received third context data, control the communication interface to retransmit the first context data to the at least one other robot.

10. A method performed by a robot, the method comprising:
receiving, from a management server, a signal indicating that an error has occurred in the management server;
acquiring first context data through a sensor of the robot;
receiving second context data acquired by at least one other robot;
identifying at least one context data of the first context data and the second context data based on a collaboration scenario of the robot and the at least one other robot;
inputting the identified at least one context data to a predetermined task allocation algorithm related to the collaboration scenario to acquire task information corresponding to the robot;
driving the robot based on the acquired task information; and
based on the signal indicating that the error has occurred in the management server being received from the management server, performing a task allocation function based on the collaboration scenario.

11. The method of claim 10,
wherein the acquiring of the task information includes, based on the identified at least one context data and constant data of the robot, acquiring the task information corresponding to the robot, and
wherein the constant data includes at least one of identification information of the robot, specification information of the robot, function information of the robot, map information corresponding to a space where the robot is located, or priority information for each task.

12. The method of claim 10, wherein the identifying of the context data includes:
based on types of a plurality of elements related to the collaboration scenario of the robot and the at least one other robot, identifying the at least one context data corresponding to each of the plurality of elements among the first context data and the second context data; and
inputting the at least one context data corresponding to each of the plurality of elements into the predetermined task allocation algorithm to acquire the task information corresponding to the robot.

13. The method of claim 12, wherein the identifying of the context data includes identifying the at least one context data corresponding to each type of the plurality of elements based on at least one of an acquisition time point of each of the first context data and the second context data, whether there is a similarity, or whether emergency situation information is included.

14. The method of claim 12, wherein the plurality of elements includes at least one of type information of an external object, location information of the external object, location information of the robot, or emergency situation information.

15. The method of claim 10, wherein the predetermined task allocation algorithm includes at least one of a current task identification of the robot and the at least one other robot, a situation identification of an external object, or a cost identification for each task of the robot and the at least one other robot.

16. The method of claim 10, further comprising: transmitting the first context data to the at least one other robot; and
based on the at least one context data being identified, transmitting the identified at least one context data to the at least one other robot.

17. The method of claim 10, further comprising:
based on third context data identified based on the collaboration scenario being received from the at least one other robot, inputting context data having a higher priority among the received third context data and the identified at least one context data into the predetermined task allocation algorithm to acquire the task information corresponding to the robot.

18. The method of claim 10, further comprising:
transmitting the first context data to the at least one other robot;
based on third context data identified based on the collaboration scenario being received from the at least one other robot, identifying whether the first context data is reflected in the received third context data; and
based on the first context data identified as not being reflected in the received third context data, retransmitting the first context data to the at least one other robot.

* * * * *